(12) United States Patent
Rusek et al.

(10) Patent No.: US 12,520,246 B2
(45) Date of Patent: Jan. 6, 2026

(54) METHODS AND DEVICES FOR COMMUNICATING A PLURALITY OF GROUPS OF SYMBOL SEQUENCES, A RELATED TRANSMIT NODE AND A RELATED RECEIVE NODE

(71) Applicant: Sony Group Corporation, Tokyo (JP)

(72) Inventors: Fredrik Rusek, Eslöv (SE); Erik Bengtsson, Eslöv (SE); Jose Flordelis, Lund (SE); Kun Zhao, Malmö (SE); Olof Zander, Södra Sandby (SE)

(73) Assignee: SONG GROUP CORPORATION, Tokyo (JP)

( * ) Notice: Subject to any disclaimer, the term of this patent is extended or adjusted under 35 U.S.C. 154(b) by 31 days.

(21) Appl. No.: 18/691,420

(22) PCT Filed: Sep. 1, 2022

(86) PCT No.: PCT/EP2022/074317
§ 371 (c)(1),
(2) Date: Mar. 12, 2024

(87) PCT Pub. No.: WO2023/052026
PCT Pub. Date: Apr. 6, 2023

(65) Prior Publication Data
US 2024/0414661 A1 Dec. 12, 2024

(30) Foreign Application Priority Data
Oct. 1, 2021 (SE) .................................... 2151207-4

(51) Int. Cl.
*H04W 52/26* (2009.01)
*H04L 27/36* (2006.01)
*H04W 52/48* (2009.01)

(52) U.S. Cl.
CPC ......... *H04W 52/262* (2013.01); *H04L 27/366* (2013.01); *H04W 52/48* (2013.01)

(58) Field of Classification Search
CPC .. H04W 52/262; H04W 52/48; H04L 27/366; H04L 27/36; H04L 27/38; H04L 1/0003;
(Continued)

(56) References Cited

U.S. PATENT DOCUMENTS 7,280,606 B2 * 10/2007 Kim ...................... H04L 1/0071
375/295
8,416,871 B2 * 4/2013 Zheng ................... H04L 1/1819
370/344
(Continued)

FOREIGN PATENT DOCUMENTS

| CA | 3047814 A1 | 8/2018 |
|---|---|---|
| WO | 2019242544 A1 | 12/2019 |
| WO | 2020168240 A1 | 8/2020 |

OTHER PUBLICATIONS

International Search Report and Written Opinion from corresponding International Application No. PCT/EP2022/074317, mailed on Nov. 18, 2022, 15 pages.
(Continued)

*Primary Examiner* — Sophia Vlahos
(74) *Attorney, Agent, or Firm* — Tucker Ellis LLP

(57) ABSTRACT

Disclosed is a method, performed by a transmit node, for transmitting a plurality of groups of symbol sequences comprising a first group of symbol sequences and a second group of symbol sequences. The method comprises obtaining a bit sequence for transmission. The method comprises obtaining, based on the bit sequence, M different coded versions of the bit sequence. The M is a positive integer. The method comprises obtaining the first group of symbol sequences based on modulating the M different coded versions with a first bitmap of a plurality of bitmaps of a (Continued)

modulation scheme. The method comprises obtaining the second group of symbol sequences based on modulating M different coded versions with a second bitmap of the plurality of bitmaps. The second bitmap and the first bitmap are different. The method comprises performing at least one transmissions of the first group of symbol sequences and of the second group of symbol sequences, to a receive node.

18 Claims, 10 Drawing Sheets

(58) Field of Classification Search
CPC ..... H04L 1/08; H04L 1/1819; H04L 27/0008; H04L 27/3472; H04L 1/1816
See application file for complete search history.

(56) References Cited

U.S. PATENT DOCUMENTS

| | | | | |
|---|---|---|---|---|
| 8,995,568 | B1 * | 3/2015 | Wu | H04K 1/006 375/295 |
| 2003/0072292 | A1 * | 4/2003 | Yoon | H04B 7/264 370/441 |
| 2006/0036922 | A1 | 2/2006 | Hong | |
| 2010/0262885 | A1 * | 10/2010 | Cheng | H04L 1/0026 714/748 |
| 2010/0322334 | A1 * | 12/2010 | Wang | H04L 5/0007 375/267 |
| 2011/0142163 | A1 * | 6/2011 | Kwon | H04L 1/1812 375/295 |
| 2012/0263107 | A1 | 10/2012 | Taghavi | |
| 2018/0062904 | A1 | 3/2018 | Hwang | |
| 2018/0331788 | A1 * | 11/2018 | Kim | H04L 1/007 |
| 2019/0141499 | A1 | 5/2019 | Wang | |
| 2021/0067266 | A1 | 3/2021 | Ahn | |

OTHER PUBLICATIONS

Office Action and Search Report from corresponding Swedish Application No. 2151207-4, mailed on Jun. 9, 2022, 8 pages.

* cited by examiner

METHODS AND DEVICES FOR COMMUNICATING A PLURALITY OF GROUPS OF SYMBOL SEQUENCES, A RELATED TRANSMIT NODE AND A RELATED RECEIVE NODE

The present disclosure pertains to the field of wireless communications. The present disclosure relates to methods for communicating a plurality of groups of symbol sequences, a transmit node and a receive node.

BACKGROUND

3rd Generation Partnership Project (3GPP) Fifth Generation (5G) systems (such as New Radio (NR), Machine Type Communication (MTC), and/or Narrow-Band (NB) Internet of Things (IoT)) are transmitting the same data in repetitions, between a transmit node and a receive node, in order to build up a higher Signal to Noise Ratio (SNR). During such repetitive transmissions, the same data is modulated using modulation techniques, such as Quadrature Phase Shift Keying (QPSK). As of today, the bitmap between coded bits and QPSK constellations remain constant and the same across all repetitions.

SUMMARY

The constant bitmap is suboptimal in terms of energy performance and communication performance.

Accordingly, there is a need for devices and methods for uplink, downlink, and/or sidelink communication, which may mitigate, alleviate, or address the shortcomings existing and provide an improved energy performance and an improved communication performance, such as a reduced number of repetitions (for example fewer than an average number of repetitions if Hybrid Automatic Repeat Request is used), a reduced transmit power per repetitions, and/or more data per repetition.

Disclosed is a method, performed by a transmit node, for transmitting a plurality of groups of symbol sequences. The plurality of groups of symbol sequences comprises a first group of symbol sequences and a second group of symbol sequences. The method comprises obtaining a bit sequence for transmission. The method comprises obtaining, based on the bit sequence, M different coded versions of the bit sequence. M is a positive integer. The method comprises obtaining the first group of symbol sequences based on modulating the M different coded versions with a first bitmap of a plurality of bitmaps of a modulation scheme. The method comprises obtaining the second group of symbol sequences based on modulating M different coded versions with a second bitmap of the plurality of bitmaps. The second bitmap and the first bitmap are different. The method comprises performing at least one transmission of the first group of symbol sequences and of the second group of symbol sequences, to a receive node.

Further, a transmit node is provided. The transmit node comprises memory circuitry, processor circuitry, and a wireless interface, wherein the wireless device is configured to perform any of the methods disclosed herein.

It is an advantage of the present disclosure that the disclosed method and the disclosed transmit node provide an improved communication performance, for transmitting a plurality of groups of symbol sequences. For example, the present disclosure can lead to an improved SNR. The present disclosure provides multiple bitmaps which can lead to an optimized (such as reduced) number of repetitions. For example, the present disclosure can lead to a reduced number of repetitions (for example fewer than an average number of repetitions if Hybrid Automatic Repeat Request is used), a reduced transmit power per repetitions, and/or more data per repetition. Also, the present disclosure provides an improved energy performance. Further, the improved communication performance of the disclosed transmit node may lead to an improved power consumption at the disclosed transmit node.

Disclosed is a method, performed by a receive node, for receiving a plurality of groups of symbol sequences. The plurality of groups of symbol sequences comprises a first group of symbol sequences of M coded versions and a second group of symbol sequences of M coded versions, wherein M is a positive integer. The method comprises receiving at least one transmission of the first group of symbol sequences and of the second group of symbol sequences, from a transmitter node. The method comprises obtaining, for each coded version included in the first group of symbol sequences, a first bit sequence based on demodulating the first group of symbol sequences using a first bitmap of a plurality of bitmaps of a modulation scheme. The method comprises obtaining, for each coded version included in the second group of symbol sequences, a second bit sequence based on demodulating the second group of symbol sequences using a second bitmap of the plurality of bitmaps. The second bitmap and the first bitmap are different. The method comprises determining a data packet based on the first bit sequences and the second bit sequences.

Further, a receive node is provided. The receive node comprises memory circuitry, processor circuitry, and a wireless interface, wherein the receive node is configured to perform any of the methods disclosed herein.

It is an advantage of the present disclosure that the disclosed method and the disclosed transmit node provide an improved communication performance, for receiving a plurality of groups of symbol sequences. For example, the present disclosure can lead to an improved SNR at the receive node. For example, the present disclosure can lead to reduced number of repetitions (for example fewer than an average number of repetitions if Hybrid Automatic Repeat Request is used), a reduced transmit power per repetitions, and/or more data per repetition. The present disclosure provides multiple bitmaps which can lead to an optimized (such as reduced) number of repetitions. This may lead to an improved power consumption at the disclosed receive node. It may also be appreciated that the disclosed technique provides an improved reliability compared to legacy systems, which use the same bitmaps across repetitions.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
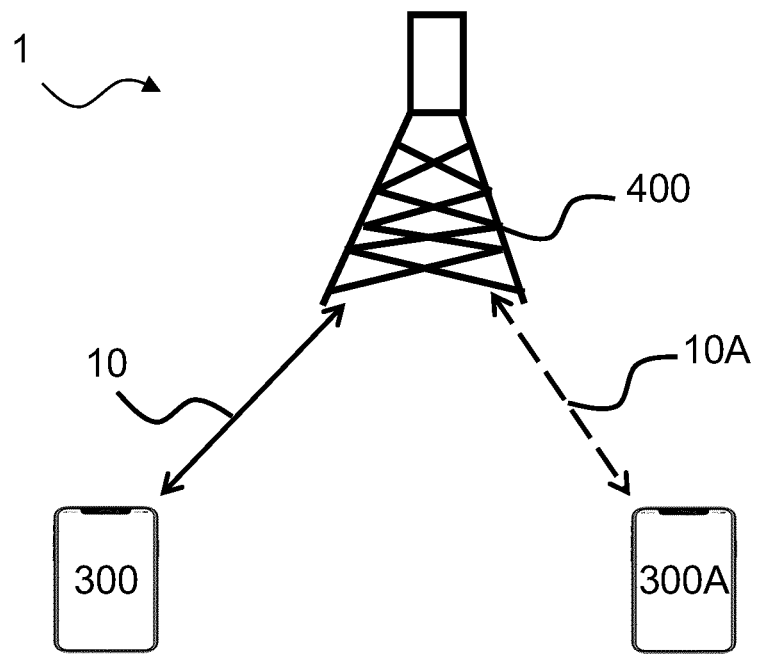
FIG. 1 is a diagram illustrating an example wireless communication system comprising an example transmit node and an example receive device according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a diagram illustrating an example wireless communication system 1 comprising an example receive node and an example transmit node according to this disclosure.

As discussed in detail herein, the present disclosure relates to a wireless communication system 1 comprising a cellular system, for example, a 3GPP wireless communication system.

The wireless communication system 1 described herein may comprise one or more wireless devices 300, 300A. The wireless device may comprise a mobile device (such as a mobile phone) and/or a user equipment, UE.

The network node 400 may be seen as a radio access network node operating in the radio access network, such as a base station, an evolved Node B, eNB, gNB in NR. In one or more examples, the RAN node is a functional unit which may be distributed in several physical units.

The wireless communication system 1 described herein may comprise one or more network nodes 400, such as one or more of: a base station, an eNB, a gNB and/or an access point.

The wireless device 300, 300A may be configured to communicate with the network node 400 via a wireless link (or radio access link) 10, 10A.

In one or more examples, the disclosed transmit node may be a wireless device, such as wireless device 300. In one or more examples, the disclosed receive node may be a network node, such as network node 400. For example, the disclosed technique may be applicable to uplink communications.

It may be envisaged that in one or more other examples, the disclosed transmit node may be a network node (such as network node 400), while the disclosed receive node may be a wireless device (such as wireless device 300). For example, the disclosed technique may be applicable to downlink communications.

It may be envisaged that in one or more other examples, the disclosed transmit node may be a wireless device (such as wireless device 300), while the disclosed receive node may be a wireless device (such as wireless device 300A). For example, the disclosed technique may be applicable to sidelink communications.

A data packet u of information bits is to be transmitted by a transmit node. The number of bits in data packet u may be arbitrary. Prior to transmission, an error correction code is applied which results in a bit sequence v. The coding rate of error correction may be arbitrary. The bit sequence v is mapped to a QPSK constellation via a bitmap B, resulting in a symbol sequence. The disclosed technique is not limited to QPSK and can be applied to other modulation constellations.

This can be Expressed as:

$$a=B(v)$$

where a denotes a symbol sequence including QPSK symbols, and B denotes the bitmap. It may be noted that as QPSK is used, the two first bits in v determine the first symbol in a, the third and fourth bits in v determine the second symbol in a, etc.

In 3GPP systems with repetitions, the signal a is transmitted N times. In other words, the sequence [a a . . . a] is transmitted with N repetitions of the symbol sequence a. In practice, a is transmitted in both time and frequency, but the precise allocation in time and frequencies may be arbitrary. The notation [a a . . . a] is used herein to indicate N repetitions.

In some systems, for example in Physical Uplink Shared Channel (PUSCH) repetitions, four different error correction codes may be used across the repetitions. For example M<N different error correction codes can be applied. In repetitions 1 to M, the coded versions (v1, v2, . . . , vM) of the bit sequence u are all different from one another, although they carry the same information u. In repetitions M+1 to 2 M, the same coded versions (v1, v2, . . . , vM) are used as in repetitions 1 to M.

The transmit node can transmit the following symbol sequence (where N/M is assumed to be an integer):

$$[\underbrace{a_1 a_2 \ldots a_M}_{M\ repetitions}\ \underbrace{a_1 a_2 \ldots a_M}_{M\ repetitions}\ \ldots\ \underbrace{a_1 a_2 \ldots a_M}_{M\ repetitions}], a_m = B(v_m) \quad (1)$$

$$\underbrace{\phantom{xxxxxxxxxxxxxxxxxxxxxxxxxxxxxxxxxxxxxxxx}}_{N\ transmissions\ of\ a\_m}$$

where the same bitmap, B, is used in all N transmissions. In other words, the bit sequence u is transmitted N times. The group of symbol sequences comprising $a_1\ a_2\ \ldots\ a_M$ is transmitted as N/M copies.

Figure 2:
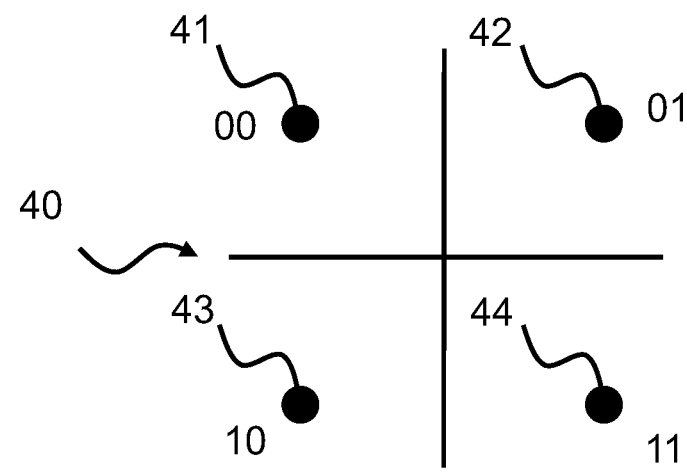
FIG. 2 is a diagram illustrating example bitmaps for Quadrature Phase Shift Keying (QPSK) according to this disclosure.
Figure 2:
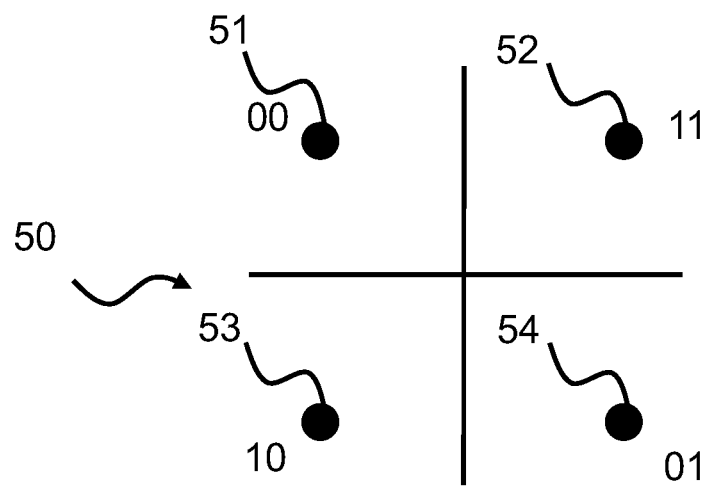
Figure 2:
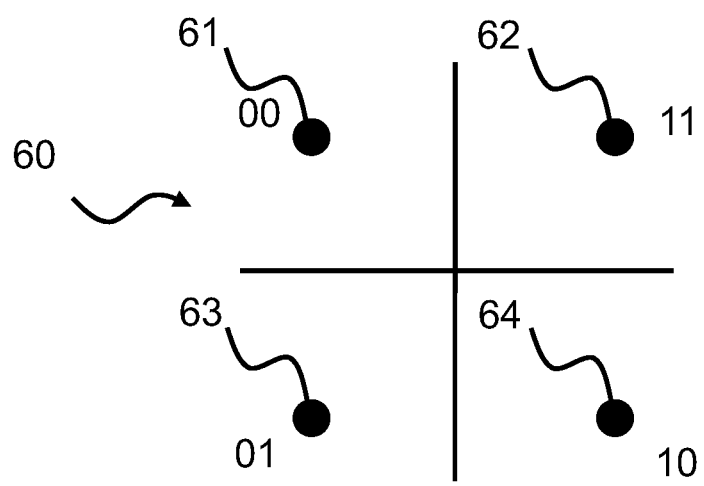

FIG. 2 is a diagram illustrating example bitmaps for Quadrature Phase Shift Keying (QPSK). FIG. 2 shows a first bitmap 40, a second bitmap 50, and a third bitmap 60.

As disclosed herein, the term "bitmap" may be seen as the mapping of a group of bits to a symbol of a modulation scheme. The terms "bitmap" and "bitmapping" may be used interchangeably in this disclosure.

The first bitmap 40 (referred to as $B_1$ in Equation (2)) comprises a first primary constellation point 41, a first secondary constellation point 42, a first tertiary constellation point 43, and a first quaternary constellation point 44. The first primary constellation point 41 represents bits "00". The first secondary constellation point 42 represents bits "01". The first tertiary constellation point 43 represents bits "10". The first quaternary constellation point 44 represents bits "11".

In NR, only the first bitmap 40 is used and remains constant across all repetitions.

The present disclosure introduces more than one bitmap, such as a plurality of bitmaps, such as a second bitmap 50, and/or a third bitmap 60, in addition to the first bitmap 40.

The second bitmap 50 (referred to as $B_2$ in Equation (2)) comprises a second primary constellation point 51, a second secondary constellation point 52, a second tertiary constellation point 53, and a second quaternary constellation point 54. The second primary constellation point 51 represents bits "00". The second secondary constellation point 52 represents bits "11". The second tertiary constellation point 53 represents bits "10". The second quaternary constellation point 54 represents bits "01".

The third bitmap 60 (referred to as $B_3$ in Equation (2)) comprises a third primary constellation point 61, a third secondary constellation point 62, a third tertiary constellation point 63, and a third quaternary constellation point 64. The third primary constellation point 61 represents bits "00". The third secondary constellation point 62 represents bits "11". The third tertiary constellation point 63 represents bits "01". The third quaternary constellation point 64 represents bits "10".

The present disclosure proposes to construct the symbol sequences for transmission by a transmit node for example as:

$$[\underbrace{B_1(v_1)B_1(v_2) \ldots B_1(v_M)}_{\text{first group of symbol sequence}} \underbrace{B_2(v_1)B_2(v_2) \ldots B_2(v_M)}_{\text{second group of symbol sequence}} \underbrace{B_3(v_1)B_3(v_2) \ldots B_3(v_M)}_{\text{third group of symbol sequence}} \underbrace{B_1(v_1)B_1(v_2) \ldots B_1(v_M)}_{\text{repetition of 1st group}} \ldots ] \quad (2)$$

$$\underbrace{\hspace{6cm}}_{N/M \text{ transmissions of the first, second, and third groups of symbol sequence}}$$

In other words, for the first transmission of a first group of symbol sequences, the first bitmap 40 (referred to as $B_1$ in Equation (2)) is applied to the M coded versions of the bit sequence. For the first transmission of the second group of symbol sequences, the second bitmap 50 (referred to as $B_2$ in Equation (2)) is applied the M coded versions of the bit sequence. For the transmission of a third groups of symbol sequences, the third bitmap 60 (referred to as $B_3$ in Equation (2)) is applied the M coded versions of the bit sequence. For the second transmission of the first group of symbol sequences, the first bitmap 40 (referred to as $B_1$ in Equation (2)) is applied the M coded versions of the bit sequence. The method can continue to apply the second bitmap, followed by the third bitmap to the second transmissions of the second group of symbol sequences and the third groups of symbol sequences respectively, etc.

For example, M different coded versions of the same bit sequence are generated. Each version can comprise a number of coded bits, which may be fairly large. For each of the M coded versions, a corresponding symbol sequence may be obtained by applying the same bitmap, for example $B_1$ as illustrated in Equation (5) to obtain, e.g. the first group of symbol sequences. For example, the M different coded versions of the same bit sequence may be duplicated (N/M)-1 times after the first transmission. Stated differently, the M coded versions may be repeated N/M-1 times after the first transmission. For each of the subsequent repetitions, a different bitmapping compared to $B_1$ is used, for example $B_2$ or $B_3$, to generate an additional symbol sequence, such as the second group of symbol sequences and optionally the third groups of symbol sequences. For example, when the number of bitmaps is less than N/M, then a repetitive pattern is used, and the same mapping, for example $B_1$, is used again at some point.

The order of application of the bitmaps may be selected by a receive node and/or a transmit node and may be communicated between the receive node and the transmit node. Two consecutive applications of bitmaps use different bitmaps in the present disclosure.

It may be envisaged that the order of application of the bitmaps may be pre-determined.

The present disclosure improves energy performance by a factor of 4/3 (for example in linear scale) because this is the gain in minimum Euclidean square distance. This can correspond to about 1.25 dB.

The present disclosure may be seen as an averaging of, or an equalization of, the Euclidean distances between the constellation points illustrated in FIG. 2. For example, when the same bitmap is used for all transmissions, such as $B_1$, the error probability is larger for detecting "10" or "01", assuming "00" is transmitted, than for detecting "11", for example:

$$P(\text{Demodulating 10 or 10}|\text{Transmitting 00}) > P(\text{Demodulating 11}|\text{Transmitting 00}) \quad (3)$$

This may be explained by the squared Euclidean distance being larger by a factor of 2, e.g. the difference in geometrical distance to the constellation point "11" illustrated by point 44 in $B_1$ of FIG. 2.

The present disclosure introduces an altering (such as a change, and/or a rotation) of the bitmap to $B_2$ and $B_3$. With the disclosed technique, the average probability over 3 transmissions, assuming that "00" is transmitted, becomes the same, as illustrated in FIG. 2, for example:

$$P(\text{Demodulating 01}|\text{Transmitting 00}) = P(\text{Demodulating 10}|\text{Transmitting 00}) = P(\text{Demodulating 11}|\text{Transmitting 00}) \quad (4)$$

Figure 3:
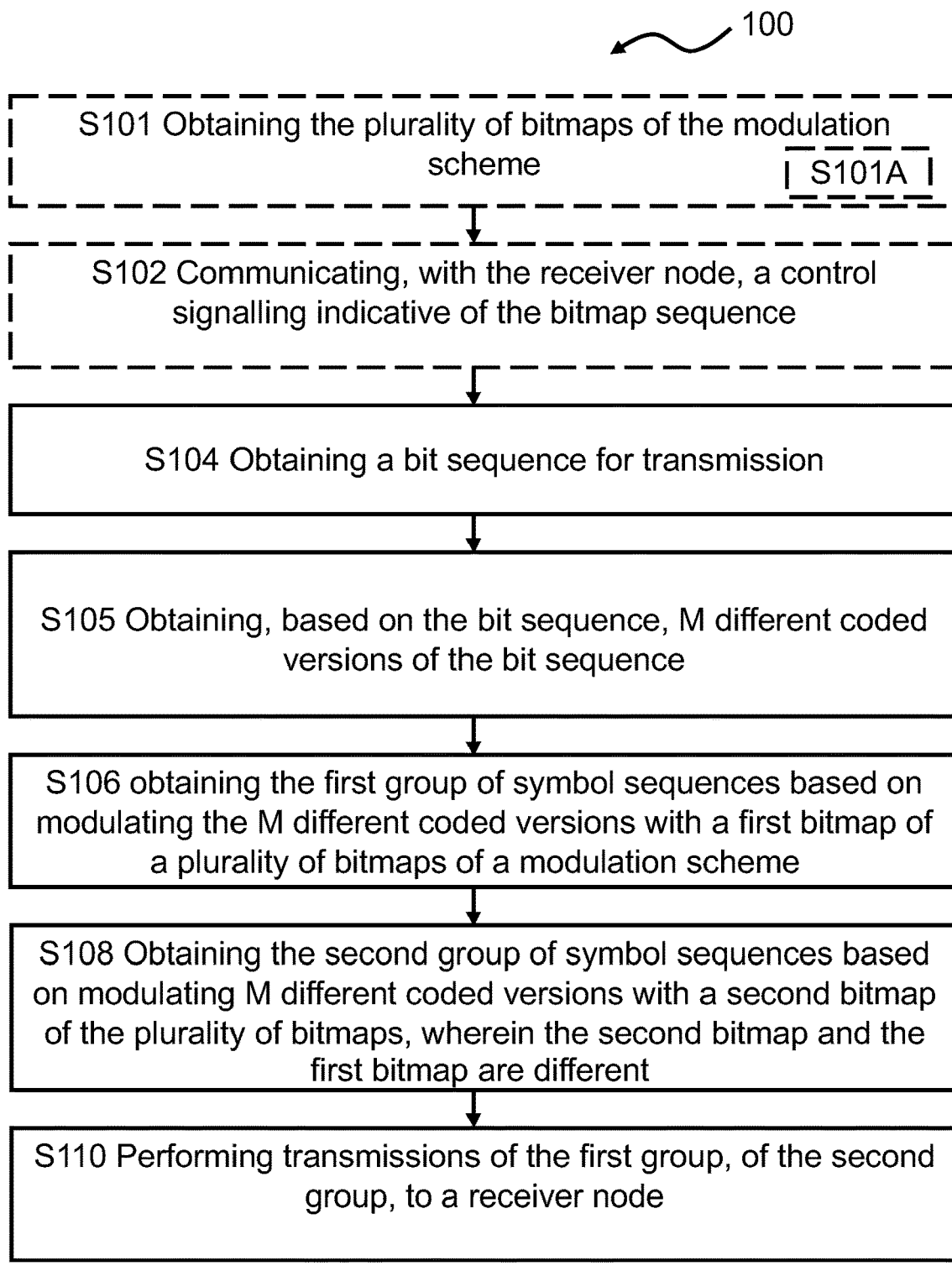
FIG. 3 is a flow-chart illustrating an example method, performed by a transmit device, for transmitting a plurality of groups of symbol sequences according to this disclosure.

FIG. 3 shows a flow-chart diagram illustrating an example method 100, performed by a transmit node according to the disclosure, for transmitting a plurality of groups of symbol sequences. The plurality of groups of symbol sequences comprises a first group of symbol sequences and a second group of symbol sequences. The method 100 may be performed by a transmit node disclosed herein, such as transmit node 500 of FIG. 5.

The method 100 may comprise obtaining S104 a bit sequence for transmission. For example, the transmit node can obtain the bit sequence from upper layers of the transmit node. In other words, a bit sequence is ready for transmission at the transmit node. The bit sequence may be part of a data packet provided by upper layers.

The method 100 comprises obtaining S105, based on the bit sequence, M different coded versions of the bit sequence. In one or more example methods, M is a positive integer. As illustrated in Equation (2), M<N different error correction codes may be used across the transmissions. The M coded versions may be expressed as (v1, v2, . . . , vM) of the bit sequence u. The M coded versions are all different from one another, although they carry the same bit sequence, and thereby the same information.

The method 100 comprises obtaining S106 the first group of symbol sequences based on modulating the M different coded versions with a first bitmap of a plurality of bitmaps of a modulation scheme. In other words, the first group of symbol sequences may be obtained by modulating (and/or encoding for example) the M different coded versions with the first bitmap of the plurality of bitmaps of the modulation scheme. For example, for QPSK, FIG. 2 illustrates a plurality of bitmaps 40 50, 60 of FIG. 2, and referred to as $B_1$ $B_2$ $B_3$ in Equation (2). The first group of symbol sequences obtained may be expressed as:

$$[B_1(v_1)B_1(v_2) \ldots B_1(v_M)] \quad (5)$$

where $B_1$ is the first bitmap, such as bitmap 40 of FIG. 1 and Equation (2).

In one or more example methods, the method may comprise modulating, using the plurality of bitmaps of a modulation scheme, the M different coded versions of the bit sequence into the plurality of groups of symbol sequences. In one or more example methods, the plurality of bitmaps comprises a first bitmap and a second bitmap, and optionally a third bitmap as illustrated in FIG. 2, 7-9.

The method 100 comprises obtaining S108 the second group of symbol sequences based on modulating M different coded versions with a second bitmap of the plurality of bitmaps. In one or more example methods, the second bitmap and the first bitmap are different, for example different bitmaps. For example, the second group of symbol sequences may be obtained by modulating (and/or encoding for example) the M different coded versions with the second bitmap of the plurality of bitmaps of the modulation scheme. For example, for QPSK, FIG. 2 and Equation (2) illustrate an example second group of symbol sequences as:

$$[B_2(v_1)B_2(v_2) \ldots B_2(v_M)] \quad (6)$$

where $B_2$ is the second bitmap, such as bitmap 50 of FIG. 2, and Equation (2).

In one or more example methods, the method may comprise obtaining a third group of symbol sequences based on modulating M different coded versions with a third bitmap of the plurality of bitmaps. For example, the third bitmap is different than any of the first and second bitmaps. For example, for QPSK, FIG. 2 and Equation (2) illustrate an example third groups of symbol sequences as:

$$[B_3(v_1)B_3(v_2) \ldots B_3(v_M)] \quad (7)$$

where $B_3$ is the third bitmap, such as bitmap 60 of FIG. 2, and Equation (2).

The method 100 comprises performing S110 at least one transmission of the first group of symbol sequences and of the second group of symbol sequences, to a receive node. In other words, the transmit node transmits the first group of symbol sequences followed by the second group of symbol sequences at least once. The transmit node may repeat the transmission of the first group of symbol sequences and of the second group of symbol sequences a number of N/ML times, where L is the number of bitmaps. This leads to the transmission of N/M groups of symbol sequences in total.

For example, N=24, M=4, L=3. The first group of symbol sequence (according to Equation (2)) may be denoted: Z1=$B_1$(v1) . . . $B_1$(vM).

The second group of symbol sequence (according to Equation (2)) may be denoted:

$$Z2=B_2(v1) \ldots B_2(vM)$$

A third group of symbol sequence (according to Equation (2)) may be denoted:

$$Z3=B_3(v1) \ldots B_3(vM)$$

For example, the transmit node can transmit in total: Z1 Z2 Z3 Z1 Z2 Z3

This leads to a total of N/M=6 transmissions of groups of symbol sequences, wherein each group of symbol sequences is transmitted N/ML=2 times.

The present disclosure allows alternating bitmaps that improve the minimum Euclidean distance between symbols obtained by compounding repetitions.

In one or more example methods, the first bitmap and the second bitmap are configured to provide an averaging of Euclidean distances between respective constellation points of the first bitmap and of the second bitmap. For example, the disclosed bitmaps are generated so that the Euclidean distance between respective constellation points of the first bitmap and of the second bitmap is averaged. In other words, the averaging may be seen as an equalizing or an equalization of Euclidean distances In one or more example methods, a number of bitmaps of the plurality of bitmaps is based on an order of the modulation scheme. Stated differently, the number of bitmaps used depends on the order of the modulation scheme. For example, the number of bitmaps may be determined based on the order of the modulation scheme. For example, when the number of bitmaps is less than N/M, then a repetitive pattern may be used, so that the same mapping as in $B_1$, $B_2$, and/or $B_3$ is used again at some point.

In one or more example methods, the plurality of bitmaps is a bitmap sequence associated with the modulation scheme. For example, a bitmap sequence may include $B_1$, $B_2$, and/or $B_3$ illustrated in FIG. 2. In one or more example methods, the plurality of bitmaps is an ordered bitmap sequence associated with the modulation scheme. For example, a bitmap sequence may include $B_1$, $B_2$, and/or $B_3$ illustrated in FIG. 2, and applied in the order $B_1$, followed by $B_2$, and optionally followed by $B_3$.

In one or more example methods, the modulation scheme is an k-Quadrature Amplitude Modulation, k-QAM, such as 16-QAM. For example, k=$2^{(2j)}$ wherein j is a positive integer. In one or more example methods, the first bitmap and the second bitmap are configured to provide, for a part of the bit sequence, an averaging of Euclidean distances between respective constellation points of each sub-quadrant of the first bitmap and respective constellation points of corresponding sub-quadrant of the second bitmap. For example, a part of the bit sequence may be a two bits part, such as any two bits of an M bit sequence including more than two bits, such as 100 bits. For example, the two bits part can be the first two bits, and/or the next two bits after the first two bits.

For example, the first 2 bits can be used to select a quadrant. The next two bits can be used to select the sub-quadrant within the already selected quadrant. The next two bits can be used to select the sub-quadrant within the sub-quadrant of the quadrant, and so on depending on the cardinality of the k-QAM constellation (e.g. depending on the size of k in a k-QAM scheme). The last two bits can be used to select the point within a final sub-quadrant. To reuse the technique for QPSK, the bitmaps per possible final sub-quadrant are changed over the bitmaps according to the same rules as the QPSK bitmaps change.

As the number of bitmaps grows to n! with the number n of constellation points, finding a relevant and non-redundant sequence of bitmaps to use becomes more involved. From the n! possible bitmaps, there are several subsets in which all bitmaps have the same performance. It may be noted that swapping constellation points that have the same Euclidean distance results in the same performance and thereby leads to redundant bitmaps, so such bitmaps belong to the same subset. It may be more involved to identify one bitmap of each subset as the number of bitmap grows. However, the disclosed technique enables finding a set of bitmaps with acceptable Euclidean distance properties. This can be done separately from this disclosure or in an initialization step to provide a lookup table and may optionally be tabulated.

Figure 7:
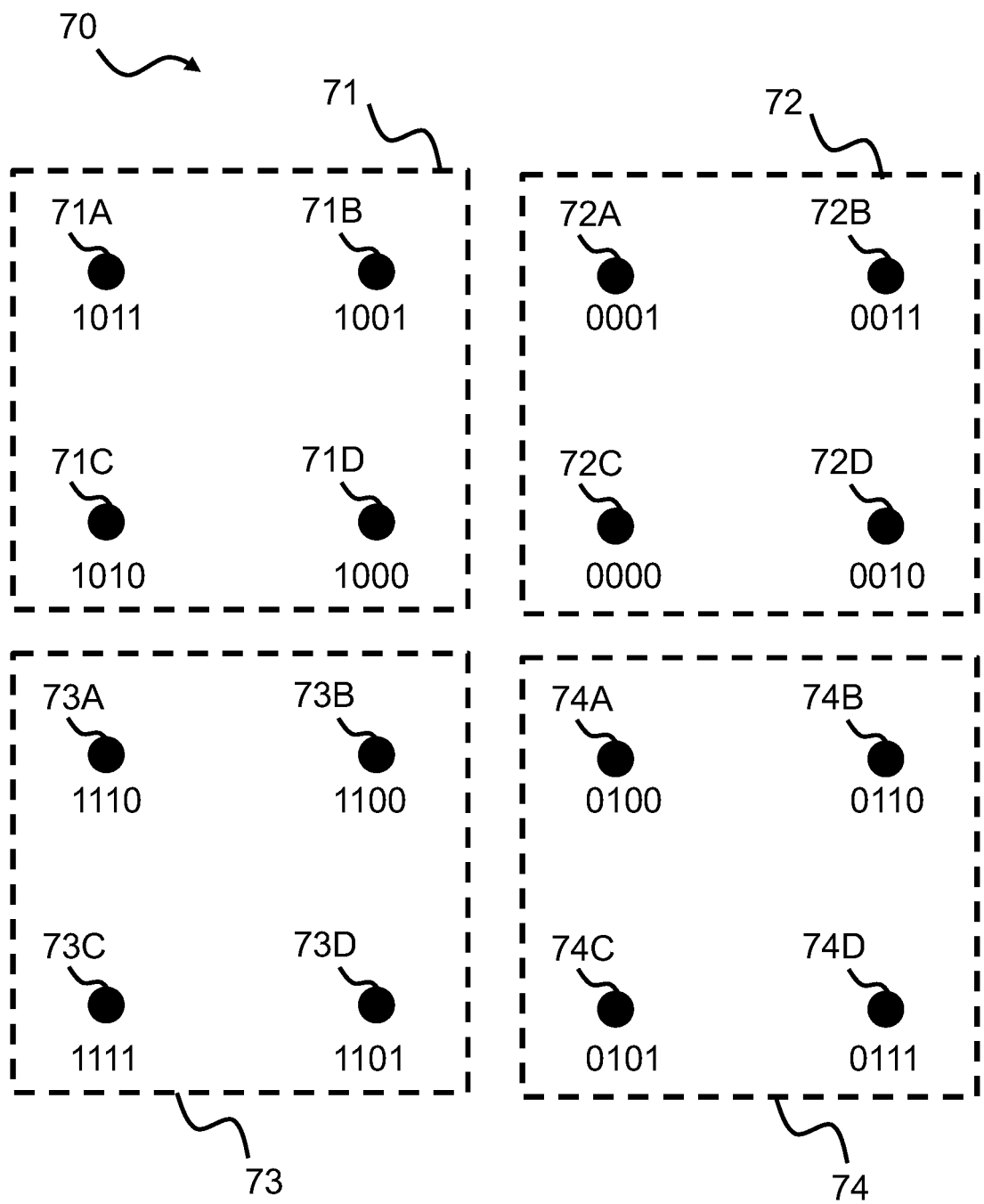
FIG. 7 is a diagram illustrating example bitmaps for 16-quadrature amplitude modulation, 16-QAM, according to this disclosure.
Figure 8:
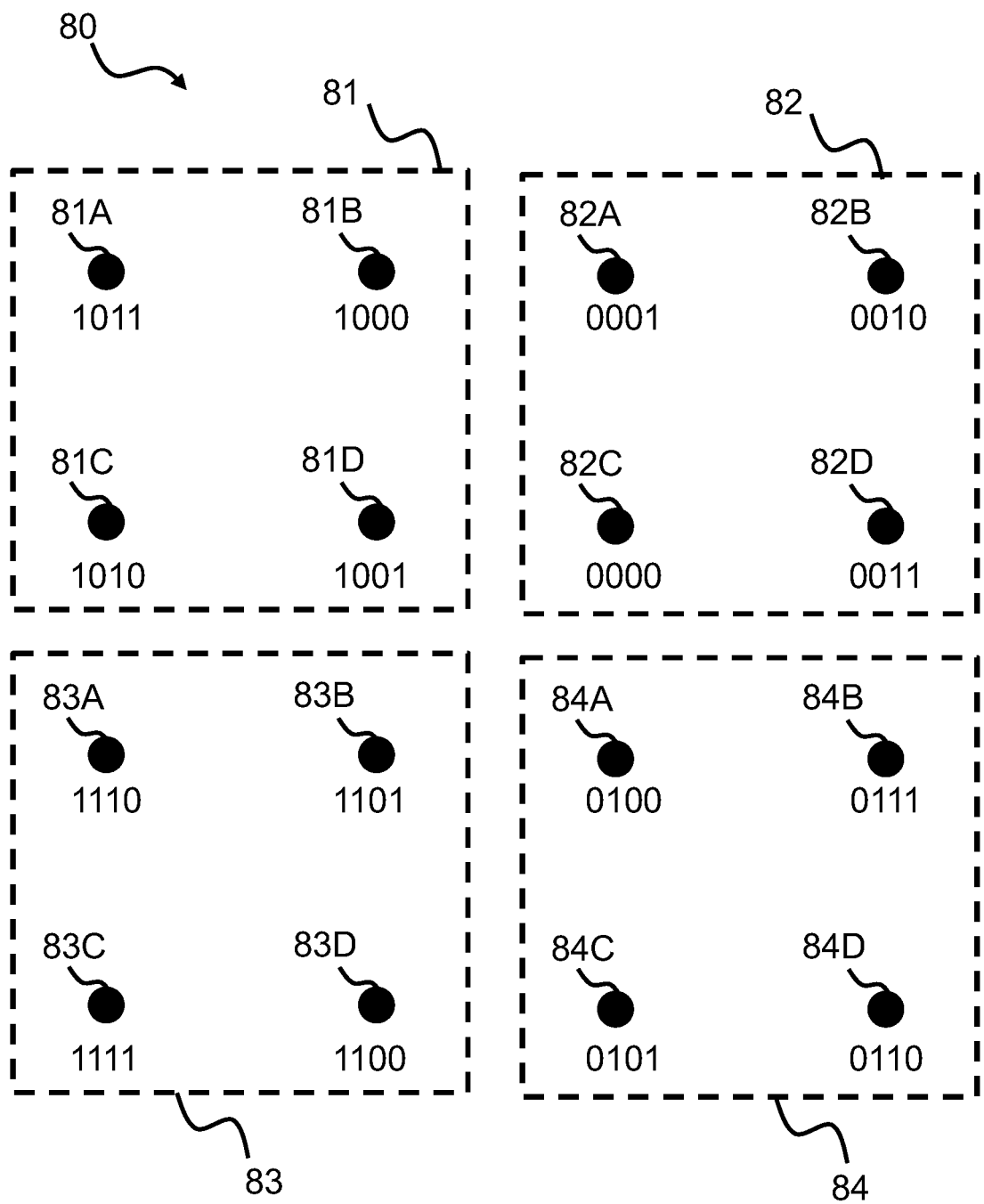
FIG. 8 is a diagram illustrating example bitmaps for 16-QAM according to this disclosure.
Figure 9:
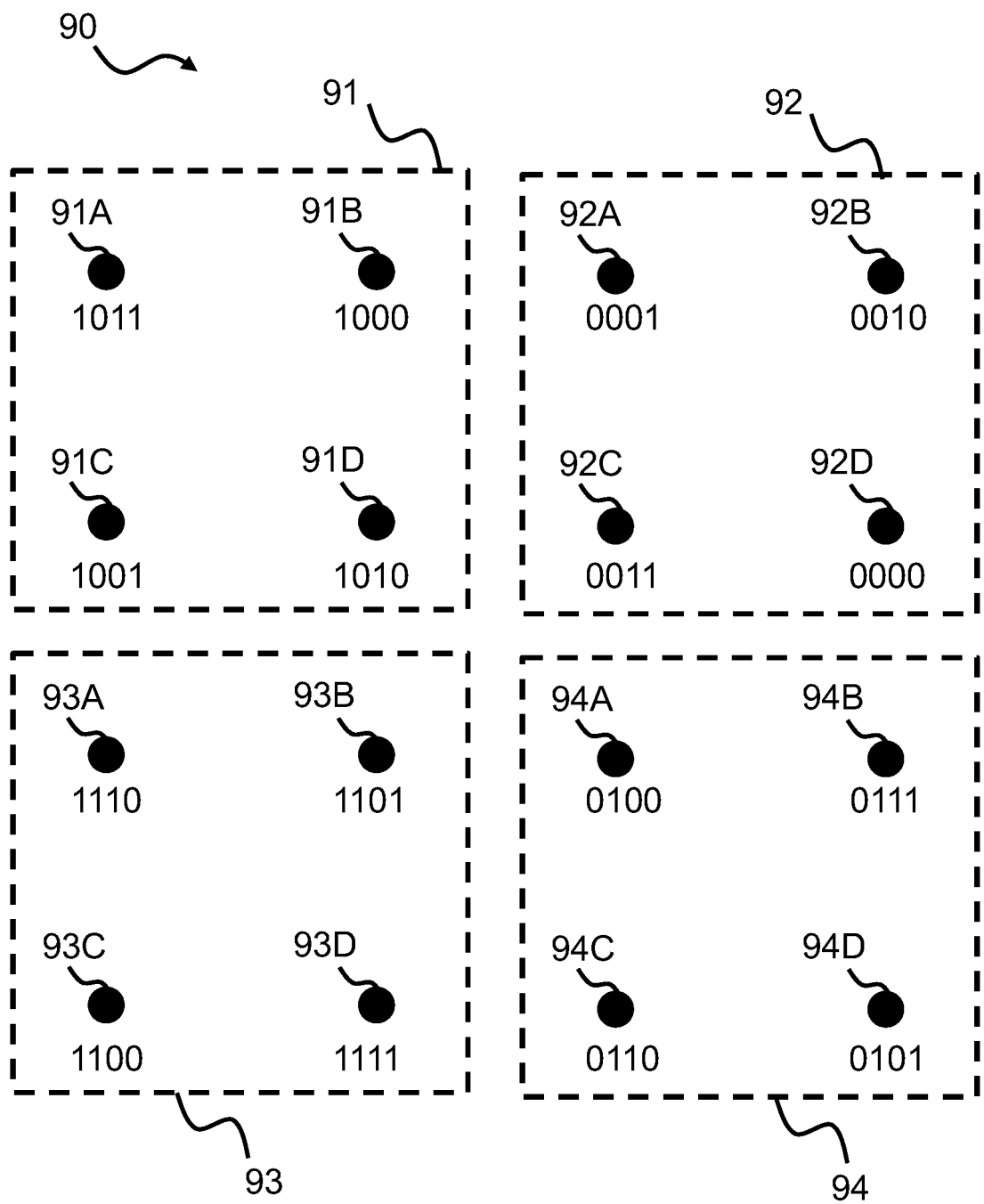
FIG. 9 is a diagram illustrating example bitmaps for 16-QAM according to this disclosure.
Figure 10:
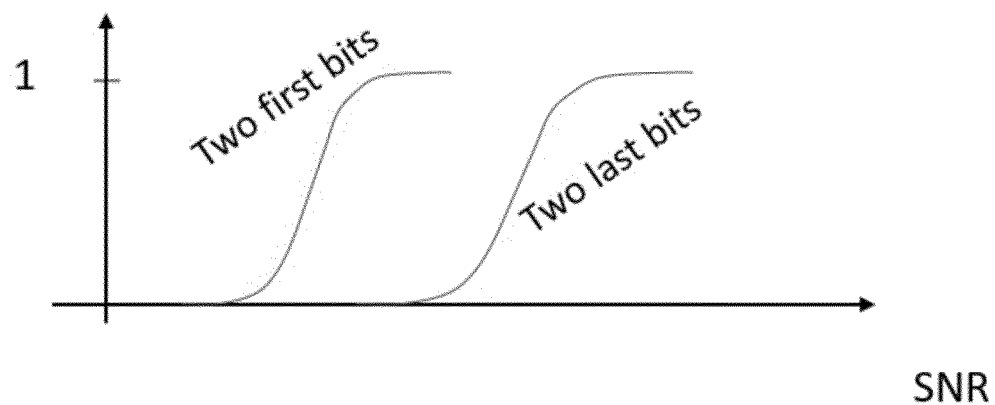
FIG. 10 is a graph illustrating example mutual information versus SNR for the two first bits of a bit sequence and the two last bits of the bit sequence.

In an example where the disclosed technique is applied to a plurality of three bitmaps for 16-QAM, such as in NR [TS 38.211, Sec. 5.1.5] which is illustrated in FIG. 7. As illustrated in FIGS. 7-9, the two first bits of the bitmap can determine the quadrant, and the last two bits can determine the position within that quadrant. However, the position within the quadrant given in the last two bits depends on quadrant selected. For example, a 16QAM symbol can be expressed as $$a = 2s_1 + s_2(s_1) \quad (8)$$

where $s_1$ and $s_2$ are QPSK symbols, and $s_2$ ($s_1$) means that $s_2$ depends on $s_1$. In simpler words, a 16QAM symbol may be seen as two times a QPSK symbol+another QPSK symbol. It is noted from Equation (8) that the first QPSK symbol is better protected than the second QPSK symbol due to the presence of the factor "2" which boosts the SNR of the first symbol. After demodulation, the quality of the bits can be measured by the mutual information between the log-likelihood ratios and the transmitted bits as illustrated in FIG. 10. A typical behavior of such experiment is illustrated in FIG. 10. As illustrated in FIG. 10 the system can operate at low error rates as soon as the SNR is sufficiently high for the two last bits to be reliable. This also means that that improving the quality of the two first bits may not lead to much gain or advantage. The present disclosure proposes to focus on the two last bits and reuse the method for QPSK illustrated in FIG. 2. For example, the 3 bitmaps $B_1$, $B_2$, and $B_3$, can be used where $B_1$ is given in FIG. 7, and $B_2$ in FIGS. 8 and $B_3$ in FIG. 9, respectively. The disclosed technique allows boosting the last two bits, which are the weakest. In other words, the disclosed technique allows boosting the last two bits against impairments of the channel (such as noise). The improvement is a factor 4/3 since the QPSK proposal of FIG. 2 is reused to each quadrant of 16-QAM.

In one or more example methods, the method 100 comprises obtaining S101 the plurality of bitmaps of the modulation scheme. For example, the plurality of bitmaps may be retrieved from a memory of the transmit node, such as based on signalling received from a receive node. For example, the plurality of bitmaps may be received via control signalling from a receive node. In one or more example methods, the obtaining S101 the plurality of bitmaps comprises obtaining S101A the plurality of bitmaps from a pre-configured setting.

In one or more example methods, the method 100 comprises communicating S102, with the receive node, control signalling indicative of the plurality of bitmaps, such as control signalling indicative of the bitmap sequence. Communicating S102 comprises transmitting, to the receive node, and/or receiving, from the receive node, control signalling indicative of the plurality of bitmaps, such as control signalling indicative of the bitmap sequence. For example, the receive node can indicate the capability of supporting the disclosed feature. For example, in downlink (DL) transmission, when the UE indicates to support such a capability, the network node can configure the disclosed operations according to the disclosed transmission scheme.

In one or more example methods, the control signalling indicative of the plurality of bitmaps comprises capability signalling indicative of the plurality of bitmaps, such as of the bitmap sequence. In one or more example methods, the capability signalling may be indicative of a release number and/or an index of a look up table associated with the corresponding bitmap sequence or plurality of bitmaps to be applied.

For example, the control signalling may indicate that for transmission n, bitmap B_p is to be applied, where p=n mod 3. For example, the bitmaps may be held constant for Y consecutive transmissions, and the control signalling may indicate that for transmission n, B_p is to be applied, where p=ceil(n/Y) mod 3, where ceil is a ceiling function that performs a division and rounds up to nearest integer towards infinity. In these examples, it is assumed that mod maps to 1 . . . n, and not to 0 . . . (n−1).

In one or more example methods, the transmitter node is a wireless device.

Figure 4:
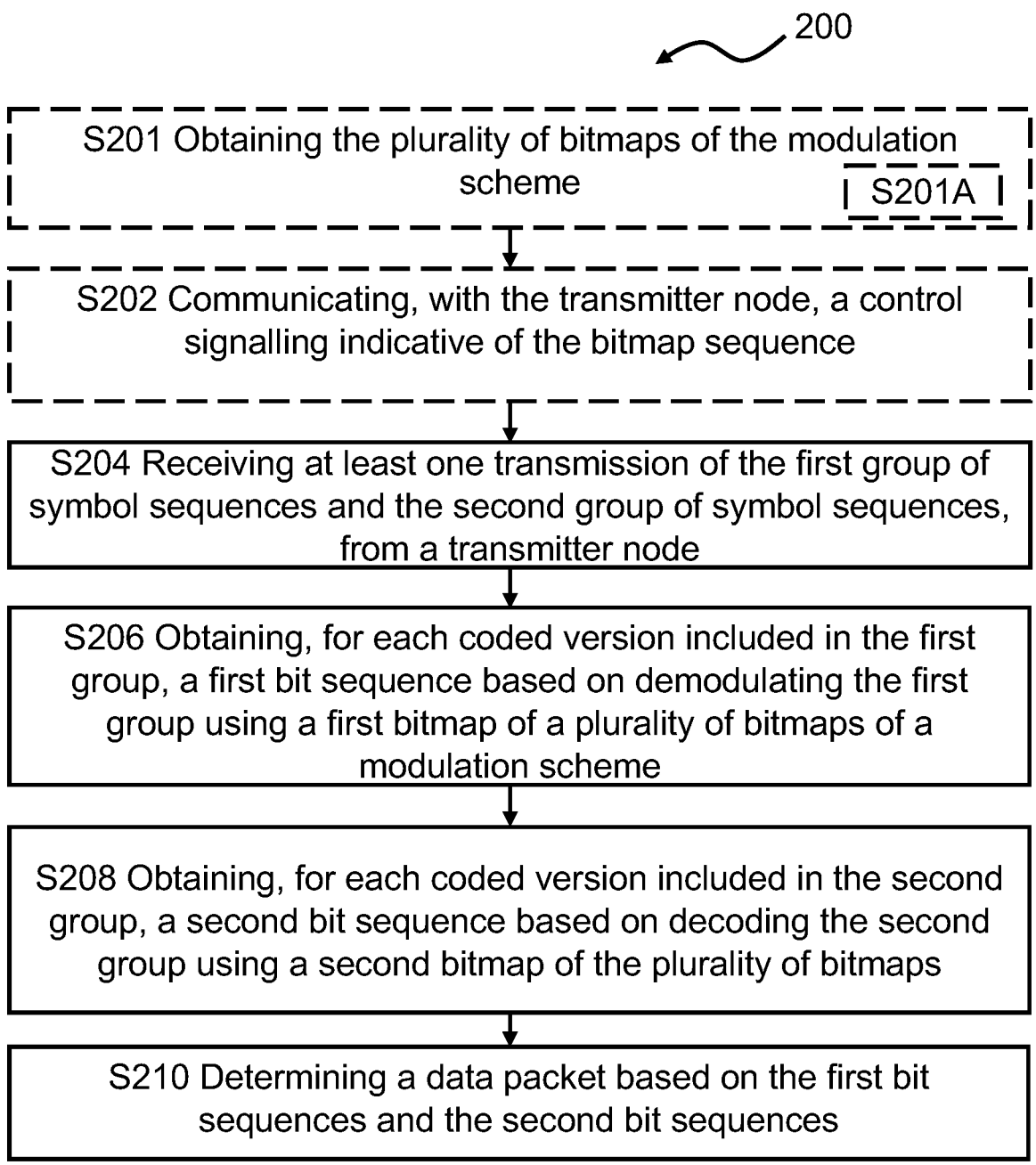
FIG. 4 is a flow-chart illustrating an example method, performed by a receive node for receiving a plurality of groups of symbol sequences according to this disclosure.

FIG. 4 shows a flow-chart illustrating an example method 200, performed by a receive node, according to the disclosure, for receiving a plurality of groups of symbol sequences.

The plurality of groups of symbol sequences comprises a first group of symbol sequences of M coded versions and a second group of symbol sequences of M coded versions, wherein M is a positive integer. The method 200 may be performed by a receive node disclosed herein, such as receive node 600 of FIG. 6.

The method 200 comprises receiving S204 at least one transmission of the first group of symbol sequences and the second group of symbol sequences, from a transmitter node The receive node can receive the transmission of the first and/or second groups of symbol sequences sent from the transmitter node in S110 of FIG. 3. In some examples, the receiver node can repeatedly receive the first group of symbol sequences and of the second group of symbol sequences a number of N/ML times, where L is the number of bitmaps. This leads to the reception of N/M groups of symbol sequences in total.

For example, N=24, M=4, L=3. The first group of symbol sequence (according to Equation (2)) may be denoted: Z1=B₁(v1) . . . B₁(vM).

The second group of symbol sequence (according to Equation (2)) may be denoted:

$$Z2 = B2(v1) \ldots B2(vM)$$

A third group of symbol sequence (according to Equation (2)) may be denoted: Z3=B₃(v1) . . . B₃(vM)

For example, the receive node can receive in total: Z1 Z2 Z3 Z1 Z2 Z3

This leads to N/M=6 receptions of groups od symbol sequences, wherein each group of symbol sequences is received N/ML=2 times.

The method 200 comprises obtaining S206, for each coded version included in the first group of symbol sequences, a first bit sequence based on demodulating the first group of symbol sequences using a first bitmap of a plurality of bitmaps of a modulation scheme.

The method 200 comprises obtaining S208, for each coded version included in the second group of symbol sequences, a second bit sequence based on demodulating and/or decoding the second group of symbol sequences using a second bitmap of the plurality of bitmaps. In one or more example methods, the second bitmap and the first bitmap are different.

In one or more example methods, the method 200 comprises determining S210 a data packet based on the first bit sequences and the second bit sequences.

In one or more example methods, the first bitmap and the second bitmap are configured to provide an averaging of Euclidean distances between respective constellation points of the first bitmap and of the second bitmap.

In one or more example methods, a number of bitmaps of the plurality of bitmaps is based on an order of the modulation scheme. In one or more example methods, when the number of bitmaps is less than N/M, then a repetitive pattern may be used, so that the same mapping as in $B_1$, $B_2$, and/or $B_3$ is used again at some point, for QPSK.

In one or more example methods, the plurality of bitmap is a bitmap sequence associated with the modulation scheme.

In one or more example methods, the plurality of bitmaps is an ordered bitmap sequence associated with the modulation scheme.

In one or more example methods, the modulation scheme is an k-Quadrature Amplitude Modulation. For example, k is a positive integer. In one or more example methods, the first bitmap and the second bitmap are configured to provide, for a part of the bit sequence, an averaging of Euclidean distances between respective constellation points of each sub-quadrant of the first bitmap and respective constellation points of corresponding sub-quadrant of the second bitmap.

In one or more example methods, the method 200 comprises obtaining S201 the plurality of bitmaps of the modulation scheme.

In one or more example methods, the obtaining S201 the plurality of bitmap comprises obtaining S201A the plurality of bitmaps from a pre-configured setting.

In one or more example methods, the method 200 comprises communicating S202, with the transmitter node, a control signalling indicative of the plurality of bitmaps, such as of the bitmap sequence. This corresponds to S102 of FIG. 3

In one or more example methods, the control signalling indicative comprises capability signalling indicative of the plurality of bitmaps, such as of the bitmap sequence.

In one or more example methods, the capability signalling may comprise a release number and/or index of a look up table.

In one or more example methods, the receive node is a network node.

Figure 5:
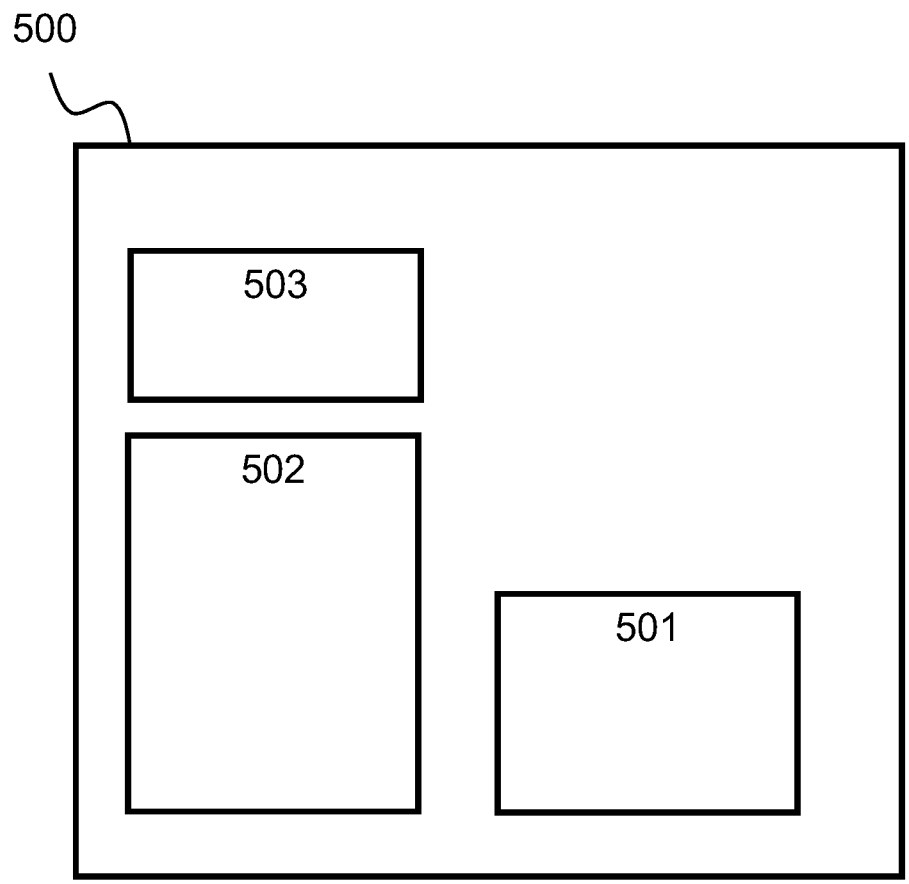
FIG. 5 is a block diagram illustrating an example transmit node according to this disclosure.

FIG. 5 shows a block diagram of an example transmit node 500 according to the disclosure. The transmit node 500 comprises memory circuitry 501, processor circuitry 502, and a wireless interface 503. The transmit node 500 may be configured to perform any of the methods disclosed in FIG. 3. In other words, the transmit node 500 may be configured for transmitting a plurality of groups of symbol sequences comprising a first group of symbol sequences and a second group of symbol sequences.

In one or more examples, the transmit node 500 may be a wireless device, such as wireless device 300 of FIG. 1. In one or more other examples, the transmit node 500 may be a network node, such as network node 400 of FIG. 1.

It may be envisaged that in one or more other examples, the transmit node may be a network node (such as network node 400), while the receive node may be a wireless device (such as wireless device 300).

The transmit node 500 is configured to obtain (such as using the processor circuitry 502 and/or via memory circuitry 501) a bit sequence for transmission.

The transmit node 500 is configured to obtain (such as using the processor circuitry 502), based on the bit sequence, M different coded versions of the bit sequence. In one or more example transmit nodes, the M is a positive integer.

The transmit node 500 is configured to obtain (such as using the processor circuitry 502), the first group of symbol sequences based on modulating the M different coded versions with a first bitmap of a plurality of bitmaps of a modulation scheme.

The transmit node 500 is configured to obtain (such as using the processor circuitry 502), the second group of symbol sequences based on modulating M different coded versions with a second bitmap of the plurality of bitmaps.

In one or more example transmit nodes, the second bitmap and the first bitmap are different.

The transmit node 500 is configured to perform (such as using the processor circuitry 502 and/or the wireless interface 503), at least one transmissions of the first group of symbol sequences and of the second group of symbol sequences, to a receive node.

The wireless interface 503 is configured for wireless communications via a wireless communication system, such as a 3GPP system, such as a 3GPP system supporting one or more of: New Radio, NR, Narrow-band IoT, NB-IoT, and Long Term Evolution-enhanced Machine Type Communication, and LTE-M, millimeter-wave.

The transmit node 500 is optionally configured to perform any of the operations disclosed in FIG. 3 (such as any one or more of S101, S101A, S102, S104, S105, S106, S108, S110). The operations of the transmit node 500 may be embodied in the form of executable logic routines (for example, lines of code, software programs, etc.) that are stored on a non-transitory computer readable medium (for example, memory circuitry 501) and are executed by processor circuitry 502).

Furthermore, the operations of the transmit node 500 may be considered a method that the transmit node 500 is configured to carry out. Also, while the described functions and operations may be implemented in software, such functionality may also be carried out via dedicated hardware or firmware, or some combination of hardware, firmware and/or software.

Memory circuitry 501 may be one or more of a buffer, a flash memory, a hard drive, a removable media, a volatile memory, a non-volatile memory, a random access memory (RAM), or other suitable device. In a typical arrangement, memory circuitry 501 may include a non-volatile memory for long term data storage and a volatile memory that functions as system memory for processor circuitry 502. Memory circuitry 501 may exchange data with processor circuitry 502 over a data bus. Control lines and an address bus between memory circuitry 501 and processor circuitry 502 also may be present (not shown in FIG. 5). Memory circuitry 501 is considered a non-transitory computer readable medium.

Memory circuitry 501 may be configured to store a bit sequence, a first group of symbol sequences, a second group of symbol sequences, a plurality of groups of symbol sequences, a first bitmap, a second bitmap, a plurality of bitmaps, a modulating scheme, a bitmap sequence, a lookup table associated with bitmaps in a part of the memory.

Figure 6:
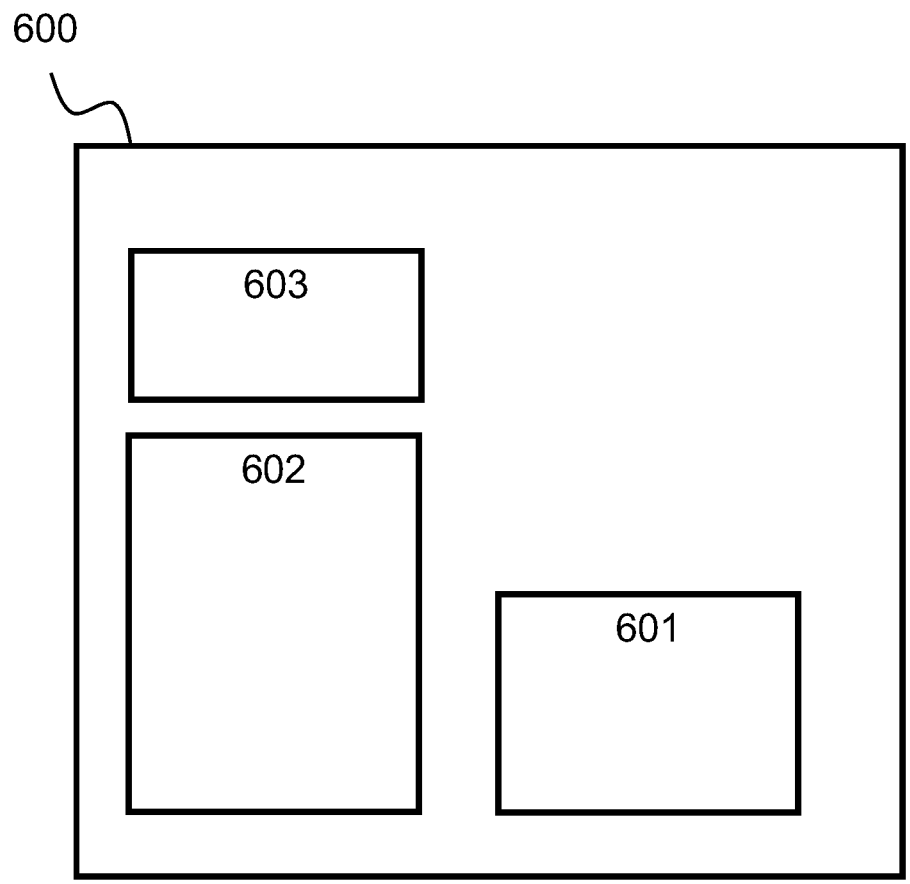
FIG. 6 is a block diagram illustrating an example receive node according to this disclosure.

FIG. 6 shows a block diagram of an example receive node 600 according to the disclosure. The receive node 600 comprises memory circuitry 601, processor circuitry 602, and a wireless interface 603. The receive node 600 may be configured to perform any of the methods disclosed in FIG. 4. In other words, the receive node 600 may be configured receiving a plurality of groups of symbol sequences comprising a first group of symbol sequences of M coded versions and a second group of symbol sequences of M coded versions, wherein M is a positive integer.

In one or more examples, the receive node 600 may be a network node, such as network node 400 of FIG. 1. In one or more other examples, the transmit node 500 may be a wireless device, such as wireless device 300 of FIG. 1.

The receive node 600 is configured to receive (such as via the wireless interface 603) at least one transmission of the first group of symbol sequences and of the second group of symbol sequences, from a transmitter node.

The receive node 600 is configured to obtain (such as using the processor circuitry 602), for each coded version included in the first group of symbol sequences, a first bit sequence based on demodulating the first group of symbol sequences using a first bitmap of a plurality of bitmaps of a modulation scheme.

The receive node 600 is configured to obtain (such as using the processor circuitry 602), for each coded version included in the second group of symbol sequences, a second bit sequence based on demodulating and/or decoding the second group of symbol sequences using a second bitmap of the plurality of bitmaps. In one or more example receive nodes, the second bitmap and the first bitmap are different.

The receive node 600 is configured to determine (such as using the processor circuitry 602) a data packet based on the first bit sequences and the second bit sequences.

The wireless interface 603 is configured for wireless communications via a wireless communication system, such as a 3GPP system, such as a 3GPP system supporting one or more of: New Radio, NR, Narrow-band IoT, NB-IoT, and Long Term Evolution-enhanced Machine Type Communication, and LTE-M, millimeter-wave.

Processor circuitry 602 is optionally configured to perform any of the operations disclosed in FIG. 4 (such as any one or more of S201, S201A, S202, S204, S206, S208, S210). The operations of the receive node 600 may be embodied in the form of executable logic routines (for example, lines of code, software programs, etc.) that are stored on a non-transitory computer readable medium (for example, memory circuitry 601) and are executed by processor circuitry 602).

Furthermore, the operations of the receive node 600 may be considered a method that the receive node 600 is configured to carry out. Also, while the described functions and operations may be implemented in software, such functionality may also be carried out via dedicated hardware or firmware, or some combination of hardware, firmware and/or software.

Memory circuitry 601 may be one or more of a buffer, a flash memory, a hard drive, a removable media, a volatile memory, a non-volatile memory, a random access memory (RAM), or other suitable device. In a typical arrangement, memory circuitry 601 may include a non-volatile memory for long term data storage and a volatile memory that functions as system memory for processor circuitry 602. Memory circuitry 601 may exchange data with processor circuitry 602 over a data bus. Control lines and an address bus between memory circuitry 601 and processor circuitry 602 also may be present (not shown in FIG. 6). Memory circuitry 601 is considered a non-transitory computer readable medium.

Memory circuitry 601 may be configured to store a bit sequence, a first group of symbol sequences, a second group of symbol sequences, a plurality of groups of symbol sequences, a first bitmap, a second bitmap, a plurality of bitmaps, a modulating scheme, a lookup table associated with the bitmaps in a part of the memory.

FIG. 7 is a diagram illustrating a bitmap 70 for a 16-quadrature amplitude modulation, 16QAM. The bitmap 70 may be denoted a first bitmap as disclosed herein. The bitmap 70 comprises 16 constellation points. The 16 constellation points are 71A, 71B, 71C, 71D, 72A, 72B, 72C, 72D, 73A, 73B, 73C, 73D, 74A, 74B, 74C, and 74D. The 16 constellation points are grouped into 4 quadrants. The four quadrants are a first primary quadrant 71, a first secondary quadrant 72, a first tertiary quadrant 73, and a first quaternary quadrant 74.

The first primary quadrant 71 comprises 4 constellation points 71A, 71B, 71C, and 71D, with the first two bits being "10". A first primary constellation point 71A represents a quadbit "1011". A first secondary constellation point 71B represents a quadbit "1001". A first tertiary constellation point 71C represents a quadbit "1010". A first quaternary constellation point 71D represents a quadbit "1000".

The first secondary quadrant 72 comprises 4 constellation points 72A, 72B, 72C, and 72D with the first two bits being "00". The second primary constellation point 72A represents a quadbit "0001". The second secondary constellation point 72B represents a quadbit "0011". The second tertiary constellation point 72C represents a quadbit "0000". The second quaternary constellation point 72D represents a quadbit "0010".

The first tertiary quadrant 73 comprises 4 constellation points 73A, 73B, 73C, and 73D with the first two bits being "11". The third primary constellation point 73A represents a quadbit "1110". The third secondary constellation point 73B represents a quadbit "1100".

The third tertiary constellation point 73C represents a quadbit "1111". The third quaternary constellation point 73D represents a quadbit "1101".

The first quaternary quadrant 74 comprises 4 constellation points 74A, 74B, 74C, and 74D with the first two bits being "01". The fourth primary constellation point 74A represents a quadbit "0100". The fourth secondary constellation point 74B represents a quadbit "0110". The fourth tertiary constellation point 74C represents a quadbit "0101". The fourth quaternary constellation point 74D represents a quadbit "0111".

For example, a part of the bit sequence may be a two bits part of a bit sequence having more than two bits. A two bits parts may be the first two bits of a bit sequence, and/or the next two bits after the first two bits, and/or the last two bits of the bit sequence. For example, the first 2 bits can be used to select a quadrant, amongst the quadrants of FIG. 7. The next or last two bits can be used to select the constellation point within the quadrant. The same applies to FIGS. 8 and 9.

FIG. 8 is a diagram illustrating an example bitmap 80 for a 16-quadrature amplitude modulation, 16QAM. The bitmap 80 may be denoted a second bitmap. The bitmap 80 comprises 16 constellation points. The 16 constellation points are 81A, 81B, 81C, 81D, 82A, 82B, 82C, 82D, 83A, 83B, 83C, 83D, 84A, 84B, 84C, and 84D. The 16 constellation points are grouped into 4 quadrants. The four quadrants are second primary quadrant 81, second secondary quadrant 82, second tertiary quadrant 83, and second quaternary quadrant 84.

The bitmap 80 is changed with respect to bitmap 70 of FIG. 7 in that the last two bits of the second column within each quadrant are changed.

The second primary quadrant 81 comprises 4 constellation points 81A, 81B, 81C, and 81D with the first two bits being "10". The first primary constellation point 81A represents a quadbit "1011". The first secondary constellation point 81B represents a quadbit "1000". The first tertiary constellation point 81C represents a quadbit "1010". The first quaternary constellation point 81D represents a quadbit "1001".

The second secondary quadrant 82 comprises 4 constellation points 82A, 82B, 82C, and 82D with the first two bits being "00". The second primary constellation point 82A represents a quadbit "0001". The second secondary constellation point 82B represents a quadbit "0010". The second tertiary constellation point 82C represents a quadbit "0000". The second quaternary constellation point 82D represents a quadbit "0011".

The second tertiary quadrant 83 comprises 4 constellation points 83A, 83B, 83C, and 83D with the first two bits being "11". The third primary constellation point 83A represents a quadbit "1110". The third secondary constellation point 83B represents a quadbit "1101". The third tertiary constellation point 83C represents a quadbit "1111". The third quaternary constellation point 83D represents a quadbit "1100".

The second quaternary quadrant 84 comprises 4 constellation points 84A, 84B, 84C, and 84D with the first two bits being "01". The fourth primary constellation point 84A represents a quadbit "0100". The fourth secondary constellation point 84B represents a quadbit "0111". The fourth tertiary constellation point 84C represents a quadbit "0101". The fourth quaternary constellation point 84D represents a quadbit "0110".

FIG. 9 is a diagram illustrating a bitmap 90 for 16-quadrature amplitude modulation, 16QAM. The bitmap 90 may be denoted as a third bitmap. The bitmap 90 comprises 16 constellation points. The 16 constellation points are 91A, 91B, 91C, 91D, 92A, 92B, 92C, 92D, 93A, 93B, 93C, 93D, 94A, 94B, 94C, and 94D. The 16 constellation points are grouped into 4 quadrants. The four quadrants are third primary quadrant 91, third secondary quadrant 92, third tertiary quadrant 93, and third quaternary quadrant 94.

The bitmap 90 is changed with respect to bitmap 70 of FIG. 7 and bitmap 80 of FIG. 8 in that the last two bits of the second row within each quadrant are changed.

The third primary quadrant 91 comprises 4 constellation points 91A, 91B, 91C, and 91D with the first two bits being "10". The first primary constellation point 91A represents a quadbit "1011". The first secondary constellation point 91B represents a quadbit "1000". The first tertiary constellation point 91C represents a quadbit "1001". The first quaternary constellation point 91D represents a quadbit "1010".

The third secondary quadrant 92 comprises 4 constellation points 92A, 92B, 92C, and 92D with the first two bits being "00". The second primary constellation point 92A represents a quadbit "0001". The second secondary constellation point 92B represents a quadbit "0010". The second tertiary constellation point 92C represents a quadbit "0011". The second quaternary constellation point 92D represents a quadbit "0000".

The third tertiary quadrant 93 comprises 4 constellation points 93A, 93B, 93C, and 93D with the first two bits being "11". The third primary constellation point 93A represents a quadbit "1110". The constellation third secondary point 93B represents a quadbit "1101". The third tertiary constellation point 93C represents a quadbit "1100". The third quaternary constellation point 93D represents a quadbit "1111".

The third quaternary quadrant 94 comprises 4 constellation points 94A, 94B, 94C, and 94D with the first two bits being "01". The fourth primary constellation point 94A represents a quadbit "0100". The fourth secondary constellation point 94B represents a quadbit "0111". The fourth tertiary constellation point 94C represents a quadbit "0110". The fourth quaternary constellation point 94D represents a quadbit "0101".

FIG. 10 shows a graph 95 illustrating mutual information versus SNR for the two first bits of a bit sequence and the two last bits of the bit sequence.

After demodulation, the quality of the bits can be measured by the mutual information between the log-likelihood ratios and the transmitted bits as illustrated in FIG. 10. A typical behavior of such experiment is illustrated in FIG. 10. As illustrated in FIG. 10 the system can operate at low error rates as soon as the SNR is sufficiently high for the two last bits to be reliable. This also means that improving the quality of the two first bits may not lead to much gain or advantage. The present disclosure proposes to focus on the two last bits and reuses the method for QPSK illustrated in FIG. 2.

Examples of methods, transmit nodes and receive nodes, according to the disclosure are set out in the following items:

Item 1. A method, performed by a transmit node, for transmitting a plurality of groups of symbol sequences comprising a first group of symbol sequences and a second group of symbol sequences, the method comprising:
  obtaining (S104) a bit sequence for transmission;
  obtaining (S105), based on the bit sequence, M different coded versions of the bit sequence, wherein M is a positive integer;
  obtaining (S106) the first group of symbol sequences based on modulating the M different coded versions with a first bitmap of a plurality of bitmaps of a modulation scheme;
  obtaining (S108) the second group of symbol sequences based on modulating M different coded versions with a second bitmap of the plurality of bitmaps, wherein the second bitmap and the first bitmap are different; and
  performing (S110) at least one transmission of the first group of symbol sequences and of the second group of symbol sequences, to a receive node.

Item 2. The method according to item 1, wherein the first bitmap and the second bitmap are configured to provide an averaging of Euclidean distances between respective constellation points of the first bitmap and of the second bitmap.

Item 3. The method according to any of the previous items, wherein a number of bitmaps of the plurality of bitmaps is based on an order of the modulation scheme.

Item 4. The method according to any of the previous items, wherein the plurality of bitmaps is a bitmap sequence associated with the modulation scheme.

Item 5. The method according to any of the previous items, wherein the plurality of bitmaps is an ordered bitmap sequence associated with the modulation scheme.

Item 6. The method according to any of the previous items, wherein the modulation scheme is an k-Quadrature Amplitude Modulation, wherein the first bitmap and the second bitmap are configured to provide, for a part of the bit sequence, an averaging of Euclidean distances between respective constellation points of each sub-quadrant of the first bitmap and respective constellation points of corresponding sub-quadrant of the second bitmap.

Item 7. The method according to any of the previous items, the method comprising obtaining (S101) the plurality of bitmaps of the modulation scheme.

Item 8. The method according to item 7, wherein obtaining (S101) the plurality of bitmap comprises obtaining (S101A) the plurality of bitmaps from a pre-configured setting.

Item 9. The method according to any of the previous items, wherein the method comprises communicating (S102), with the receive node, control signalling indicative of the plurality of bitmaps.

Item 10. The method according to item 9, wherein the control signalling comprises capability signalling indicative of the bitmap sequence.

Item 11. The method according to any of the previous items, wherein the transmitter node is a wireless device.

Item 12. A method, performed by a receive node, for receiving a plurality of groups of symbol sequences comprising a first group of symbol sequences of M coded versions and a second group of symbol sequences of M coded versions, wherein M is a positive integer, the method comprising:
  receiving (S204) at least one transmission of the first group of symbol sequences and of the second group of symbol sequences, from a transmitter node;
  obtaining (S206), for each coded version included in the first group of symbol sequences, a first bit sequence based on demodulating the first group of symbol sequences using a first bitmap of a plurality of bitmaps of a modulation scheme;
  obtaining (S208), for each coded version included in the second group of symbol sequences, a second bit sequence based on demodulating and/or decoding the second group of symbol sequences using a second bitmap of the plurality of bitmaps, wherein the second bitmap and the first bitmap are different; and
  determining (S210) a data packet based on the first bit sequences and the second bit sequences.

Item 13. The method according to item 12, wherein the first bitmap and the second bitmap are configured to provide an averaging of Euclidean distances between respective constellation points of the first bitmap and of the second bitmap.

Item 14. The method according to any of items 12-13, wherein a number of bitmaps of the plurality of bitmaps is based on an order of the modulation scheme.

Item 15. The method according to any of items 12-14, wherein the plurality of bitmap is a bitmap sequence associated with the modulation scheme.

Item 16. The method according to any of items 12-15, wherein the plurality of bitmaps is an ordered bitmap sequence associated with the modulation scheme.

Item 17. The method according to any of items 12-16, wherein the modulation scheme is an k-Quadrature Amplitude Modulation, wherein the first bitmap and the second bitmap are configured to provide, for a part of the bit sequence, an averaging of Euclidean distances between respective constellation points of each sub-quadrant of the first bitmap and respective constellation points of corresponding sub-quadrant of the second bitmap.

Item 18. The method according to any of items 12-17, the method comprising obtaining (S201) the plurality of bitmaps of the modulation scheme.

Item 19. The method according to item 18, wherein obtaining (S201) the plurality of bitmap comprises obtaining (S201A) the plurality of bitmaps from a pre-configured setting.

Item 20. The method according to any of items 12-19, wherein the method comprises communicating (S202), with the transmitter node, control signalling indicative of the plurality of bitmaps.

Item 21. The method according to item 20, wherein the control signalling comprises capability signalling indicative of the bitmap sequence.

Item 22. The method according to any of the previous items, wherein the receive node is a network node.

Item 23. A transmit node comprising memory circuitry, processor circuitry, and a wireless interface, wherein the transmit node is configured to perform any of the methods according to any of items 1-11.

Item 24. A receive node comprising memory circuitry, processor circuitry, and a wireless interface, wherein the receive node is configured to perform any of the methods according to any of items 12-22.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that Figures comprise some circuitries or operations which are illustrated with a solid line and some circuitries, components, features, or operations which are illustrated with a dashed line. Circuitries or operations which are comprised in a solid line are circuitries, components, features or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed. The example operations may be performed in any order and in any combination. It should be appreciated that these operations need not be performed in order presented. Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value.

The various example methods, devices, nodes, and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method, performed by a transmit node, for transmitting a plurality of groups of symbol sequences comprising a first group of symbol sequences and a second group of symbol sequences, the method comprising:

obtaining a bit sequence for transmission;
obtaining, based on the bit sequence, M coded versions of the bit sequence, wherein M is a positive integer;
obtaining the first group of symbol sequences based on modulating the M coded versions of the bit sequence with a first bitmap of a plurality of bitmaps of a modulation scheme;
obtaining the second group of symbol sequences based on modulating the M coded versions the bit sequence with a second bitmap of the plurality of bitmaps, wherein the second bitmap and the first bitmap are different and are configured to provide an averaging of Euclidean distances between respective constellation points of the first bitmap and of the second bitmap; and
performing at least one transmission of the first group of symbol sequences and of the second group of symbol sequences, to a receive node.

2. The method according to claim 1, wherein a number of bitmaps of the plurality of bitmaps is based on an order of the modulation scheme.

3. The method according to claim 1, wherein the plurality of bitmaps is a bitmap sequence associated with the modulation scheme.

4. The method according to claim 1, wherein the plurality of bitmaps is an ordered bitmap sequence associated with the modulation scheme.

5. The method according to claim 1, wherein the modulation scheme is an k-Quadrature Amplitude Modulation, where k is a positive integer and wherein the first bitmap and the second bitmap are configured to provide, for a part of the bit sequence, an averaging of Euclidean distances between respective constellation points of each sub-quadrant of the first bitmap and respective constellation points of corresponding sub-quadrant of the second bitmap.

6. The method according to claim 1, the method comprising obtaining the plurality of bitmaps of the modulation scheme.

7. The method according to claim 6, wherein obtaining the plurality of bitmap comprises obtaining the plurality of bitmaps from a pre-configured setting.

8. The method according to claim 1, wherein the method comprises communicating, with the receive node, control signalling indicative of the plurality of bitmaps.

9. The method according to claim 8, wherein the control signalling comprises capability signalling indicative of the bitmap sequence.

10. The method according to claim 1, wherein the transmitter node is a wireless device.

11. A method, performed by a receive node, for receiving a plurality of groups of symbol sequences comprising a first group of symbol sequences of M coded versions and a second group of symbol sequences of M coded versions, wherein M is a positive integer, the method comprising:

receiving at least one transmission of the first group of symbol sequences and the second group of symbol sequences, from a transmitter node;
obtaining, for each coded version included in the first group of symbol sequences, a first bit sequence based on demodulating the first group of symbol sequences using a first bitmap of a plurality of bitmaps of a modulation scheme;
obtaining, for each coded version included in the second group of symbol sequences, a second bit sequence based on demodulating the second group of symbol sequences using a second bitmap of the plurality of bitmaps, wherein the second bitmap and the first bitmap are different and are configured to provide an averaging of Euclidean distances between respective constellation points of the first bitmap and of the second bitmap; and determining a data packet based on the first bit sequences and the second bit sequences.

12. The method according to claim 11, wherein a number of bitmaps of the plurality of bitmaps is based on an order of the modulation scheme.

13. The method according to claim 11, wherein the plurality of bitmap is a bitmap sequence associated with the modulation scheme.

14. The method according to claim 11, wherein the plurality of bitmaps is an ordered bitmap sequence associated with the modulation scheme.

15. The method according to claim 11, wherein the modulation scheme is an k-Quadrature Amplitude Modulation, where k is a positive integer and wherein the first bitmap and the second bitmap are configured to provide, for a part of the bit sequence, an averaging of Euclidean distances between respective constellation points of each sub-quadrant of the first bitmap and respective constellation points of corresponding subquadrant of the second bitmap.

16. The method according to claim 11, the method comprising obtaining the plurality of bitmaps of the modulation scheme.

17. The method according to claim 16, wherein obtaining the plurality of bitmap comprises obtaining the plurality of bitmaps from a pre-configured setting.

18. The method according to claim 11, wherein the method comprises communicating, with the transmitter node, control signalling indicative of the plurality of bitmaps.

* * * * *